United States Patent
Cao et al.

(10) Patent No.: US 12,165,288 B2
(45) Date of Patent: Dec. 10, 2024

(54) FREQUENCY DOMAIN-BASED METHOD FOR REMOVING PERIODIC NOISE FROM RECONSTRUCTED LIGHT FIELD IMAGE

(71) Applicant: NANJING UNIVERSITY, Jiangsu (CN)

(72) Inventors: Xun Cao, Jiangsu (CN); Xiaowen Li, Jiangsu (CN); Xia Hua, Jiangsu (CN)

(73) Assignee: NANJING UNIVERSITY, Jiangsu (CN)

(*) Notice: Subject to any disclaimer, the term of this patent is extended or adjusted under 35 U.S.C. 154(b) by 317 days.

(21) Appl. No.: 17/754,874

(22) PCT Filed: Sep. 15, 2020

(86) PCT No.: PCT/CN2020/115325
§ 371 (c)(1),
(2) Date: Apr. 14, 2022

(87) PCT Pub. No.: WO2021/077944
PCT Pub. Date: Apr. 29, 2021

(65) Prior Publication Data
US 2023/0306558 A1    Sep. 28, 2023

(30) Foreign Application Priority Data

Oct. 21, 2019  (CN) .......................... 201910998260.5

(51) Int. Cl.
*G06T 5/10*    (2006.01)
*G06T 5/20*    (2006.01)
(Continued)

(52) U.S. Cl.
CPC .................. *G06T 5/70* (2024.01); *G06T 5/10* (2013.01); *G06T 5/20* (2013.01); *G06T 7/136* (2017.01); *H04N 23/957* (2023.01); *G06T 2207/10052* (2013.01)

(58) Field of Classification Search
CPC .... G06T 5/70; G06T 5/10; G06T 5/20; G06T 7/136; G06T 2207/10052; G06T 2207/20024; H04N 23/957
See application file for complete search history.

(56) References Cited

U.S. PATENT DOCUMENTS

| | | | | |
|---|---|---|---|---|
| 2005/0258343 | A1* | 11/2005 | Vuylsteke | G06T 5/70 |
| | | | | 250/216 |
| 2015/0029386 | A1* | 1/2015 | Pitts | H04N 23/81 |
| | | | | 348/335 |
| 2017/0078558 | A1 | 3/2017 | Tamura | |

FOREIGN PATENT DOCUMENTS

| CN | 103679643 A | 3/2014 |
|---|---|---|
| CN | 108337434 A | 7/2018 |
| CN | 109712107 A | 5/2019 |
| CN | 110866874 A | 3/2020 |

OTHER PUBLICATIONS

Xie et al, Reduction of periodic noise in Fourier domain optical coherence tomography images by frequency domain filtering, 2012, Biomed Tech 57(Suppl. 1) pp. 830-832 (Year: 2012).*

(Continued)

*Primary Examiner* — Aaron W Carter
*Assistant Examiner* — Kathleen M Broughton
(74) *Attorney, Agent, or Firm* — NKL Law; Allen Xue

(57) ABSTRACT

A method for removing periodic noise from a reconstructed light field image includes the steps of: acquiring a light field image of a sample; acquiring an optical center position map without the sample; calibrating the imaging centers of the microlenses and performing reconstruction on the light field image; transforming a reconstructed light field image to the frequency domain and generating an image frequency spectrum; preprocessing the image frequency spectrum; generating a low-pass filter; multiplying the low-pass filter with the preprocessed image frequency spectrum, and then setting the frequency spectrum value of the low-frequency (Continued)

component to zero; performing binarization on the reconstructed light field image frequency spectrum to obtain an image mask; removing the high-frequency periodic noise component from the original frequency spectrum of the reconstructed light field image; and transforming the filtered reconstructed light field image frequency spectrum back to the spatial domain to obtain the reconstructed light field image.

7 Claims, 2 Drawing Sheets

(51) Int. Cl.
    *G06T 5/70*     (2024.01)
    *G06T 7/136*     (2017.01)
    *H04N 23/957*     (2023.01)

(56) References Cited

OTHER PUBLICATIONS

Tholeit et al, Frequency domain filtering techniques of halftone images, 2015, IEEE 2nd International Conference on Signal Processing and Integrated Networks, pp. 1-4. (Year: 2015).*

Yadav et al, Periodic noise removal using local thresholding, 2016, IEEE 2016 Conference on Advances in Signal Processing, pp. 1-4. (Year: 2016).*

* cited by examiner

FREQUENCY DOMAIN-BASED METHOD FOR REMOVING PERIODIC NOISE FROM RECONSTRUCTED LIGHT FIELD IMAGE

TECHNICAL FIELD

The present invention belongs to the field of light field imaging, and particularly relates to the frequency domain-based method for removing periodic noise from a reconstructed light field image.

BACKGROUND

The advent of light field cameras has provided people with a new way of thinking about an image shooting mechanism. When shooting with a traditional camera, a focus position must be selected first, and once an image is captured, the focus position cannot be changed. However, in some high-speed photography scenes, such as sports and animal photography, it is of great significance to be able to achieve "refocusing after shooting".

A light field camera is implemented by adding a microlens array between a main lens and a sensor inside a traditional camera. Under the action of the microlens array, the light field camera can simultaneously capture spatial and angular information of light in a single-shot exposure, that is, a complete four-dimensional light field. After shooting, a film plane of the camera is adjusted and synthesized through a digital refocusing technology, so that reconstruction results of respectively focusing at different depths are reconstructed from a single light field image. The light field camera can achieve a good digital refocusing effect on portraits, high-speed motion, and micro close-ups in traditional photography themes. For a type-I light field camera, the microlens array is placed at one focal length in front of the sensor, microlens imaging is completely defocused relative to main lens imaging, and the resolution of a final reconstructed image is limited by the number of microlenses, resulting in a limit in the development of the type-I light field camera. For a type-II light field camera, the spatial position and focusing position of the microlens array are better designed, the microlenses are used as a relay imaging system of the main lens, the microlens imaging is focused on an imaging plane of the main lens, and the resolution of a final reconstructed image is no longer restricted by the number of microlenses, so that the imaging resolution of the light field camera is greatly improved.

There are two ways to reconstruct an image captured by the light field camera: (1) an all-in-focus method, that is, pixel blocks taken out from the microlens images are directly stitched to obtain a completely sharp reconstructed image without any changes in depth of focus across the entire image; and (2) a refocusing method, that is, the size of a synthetic aperture of the imaging system is adjusted by fusing neighborhood microlens images, and a depth of field is reduced, so that reconstructed images focused at different depths are obtained. Both methods involve taking the pixel blocks of the same size from the microlens images and stitching them together. In view of factors such as a brightness difference of the microlens images, a stitching edge of the reconstruction result is obvious, resulting in a decrease of the reconstruction effect. Since the size of each pixel block is the same, the arrangement of the stitching edge is periodic, which can be optimized by removing periodic noise of the image.

Existing commonly used spatial domain-based image denoising methods, such as mean filtering, median filtering, and Gaussian filtering, have good removal effects for particle noise, Gaussian noise, salt and pepper noise, multiplicative noise, and the like. However, for the periodic noise caused by the stitching edge in the reconstructed light field image, the above methods may blur the image while smoothing the image noise, with losing of details, in other word, suppress signals while suppressing the noise.

SUMMARY

In view of the above shortcomings of the conventional art, an objective of the present invention is to provide the frequency domain-based method for removing periodic noise from a reconstructed light field image, which can effectively remove stitching edge noise from the reconstructed light field image while protecting image details, thereby optimizing a reconstruction effect.

The technical solution for achieving the objective of the present invention is as follows.

The frequency domain-based method for removing periodic noise from a reconstructed light field image, comprising steps of:

S1. using a light field imaging system to acquire a light field image of a sample;

S2. removing the sample, directly irradiating the light field imaging system with a light source, and acquiring an optical center position map of imaging of the microlenses corresponding to the light field image;

S3. using the optical center position map to calibrate the imaging centers of the microlenses, and then performing reconstruction on the light field image acquired in step S1, so as to obtain a reconstructed light field image;

S4. transforming the reconstructed light field image to the frequency domain, and arranging the low-frequency component to the center of frequency spectrum;

S5. preprocessing the reconstructed light field image frequency spectrum obtained in step S4, i.e. taking the value of amplitude and compressing the value range;

S6. generating a low-pass filter, and protecting the low-frequency component part of the reconstructed light field image frequency spectrum in a circular region with zero frequency as the center and a radius of r;

S7. multiplying the low-pass filter with the reconstructed light field image frequency spectrum obtained in step S5, and setting the frequency spectrum value of the low-frequency component to zero;

S8. performing binarization on the reconstructed light field image frequency spectrum obtained by the processing of step S7, so as to obtain an image mask;

S9. using the image mask to filter the original frequency spectrum of the reconstructed light field image obtained in step S4, so as to remove the high-frequency periodic noise component from the frequency spectrum; and S10. transforming the filtered reconstructed light field image frequency spectrum back to the spatial domain, so as to obtain a reconstructed light field image with the periodic noise removed.

Furthermore, in step S2, the specific process of acquiring an optical center position map of imaging of microlenses corresponding to the light field image includes: directly irradiating the imaging system with a light source as a sample, insofar as it is ensured that the light source is, after being imaged by means of a main lens, sufficient to cover the entire microlens array, recording, by means of the microlenses, light at sufficient angles, imaging the microlenses in circles on a sensor, the centers of the circles serving as the imaging centers of the microlenses, thus using the light field image of the light source as an optical center position map for calculating the imaging centers of the microlenses; and adjusting the distance between the light source and the imaging system such that the microlens images do not overlap.

Furthermore, in step S3, the specific method for using the optical center position map to calibrate the imaging centers of the microlenses includes: first, initializing two two-dimensional matrixes $C_x$ and $C_y$ with the same size as a microlens array, respectively recording the horizontal and vertical coordinates of the imaging centers of the microlenses; then retrieving circles appearing in the optical center position map, and filling center coordinates of a recognized circle into corresponding positions of the matrixes $C_x$ and $C_y$ as imaging center position coordinates of the microlens at this position, and filling an interpolated value into the corresponding position of matrixes where a circle is not recognized, as an estimated value of the imaging center position coordinates of the microlens at this position.

Furthermore, in step S3, the specific method for performing reconstruction on the light field image includes: in the light field image, taking out a rectangular pixel block with the imaging centers of the microlenses as the center and a side length of (2l+1), and arranging them according to the position of the microlens array, first flipping the pixel block taken out from the microlens images and then performing orderly stitching the flipped pixel block so as to obtain a reconstructed light field image, where a value of a length l is required to be less than a microlens radius.

Furthermore, the specific method of S6 includes: initializing a two-dimensional matrix with the same size as the reconstructed light field image frequency spectrum, herein the two-dimensional matrix is divided into two parts by a circle with a radius of rat the center: the value of a matrix inside the circle is set to 0, which means that the component corresponding to this region in an object to be processed is suppressed and filtered out; and the value of a matrix outside the circle is set to 1, which means that the component corresponding to this region in an object to be processed is not affected and passes normally.

Furthermore, in step S8, the specific method for generating the image mask includes: multiplying the low-pass filter Lp with the preprocessed reconstructed light field image frequency spectrum $I_F'$, so as to obtain a reconstructed light field image frequency spectrum $I_F''$ having the low-frequency-component frequency spectrum value set to zero:

$$I_F''=Lp \times I_F',$$

setting a binarization threshold Tr, performing binarization on the reconstructed light field image frequency spectrum having the low-frequency-component frequency spectrum value set to zero to obtain an image mask M, herein, the part of M with a value of 1 corresponds to a frequency component that needs to be filtered out, of a reconstructed light field image frequency spectrum $I_F$; and adjusting a proportion of the frequency component with a value of 1 in the image mask M by changing the value of the threshold Tr, thereby adjusting the degree of noise suppression.

Furthermore, in step S9, if the value of the image mask M corresponding to a certain frequency component is 1, the frequency spectrum value of the component at the corresponding position in reconstructed light field image frequency spectrum $I_F$ is set to zero, so that a reconstructed light field image frequency spectrum $I_{Fd}$ with the high-frequency periodic noise component filtered out is obtained:

$$I_{Fd}(i, j) = \begin{cases} I_F(i, j), & M(i, j) = 0 \\ 0, & M(i, j) = 1 \end{cases},$$

Wherein i=1 . . . r, j=1 . . . c, r, and c are respectively the number of rows and columns of the reconstructed light field image $I_r$.

According to the present invention, the reconstructed light field image is transformed to the frequency domain, the image mask is generated on the basis of spectral features of the periodic noise, and the high-frequency periodic noise component in the reconstructed light field image frequency spectrum is filtered out, so that the reconstructed light field image with the periodic noise removed is obtained. Compared with the conventional art, the method is the frequency domain-based method for removing noise, which can effectively remove stitching edge periodic noise in the reconstructed light field image and avoid image blurring, thereby optimizing the reconstruction effect.

DETAILED DESCRIPTION

For making the objectives, technical solutions and advantages of the disclosure clearer, implementation modes of the disclosure will further be described below with reference to the accompanying drawings in detail.

Figure 1:
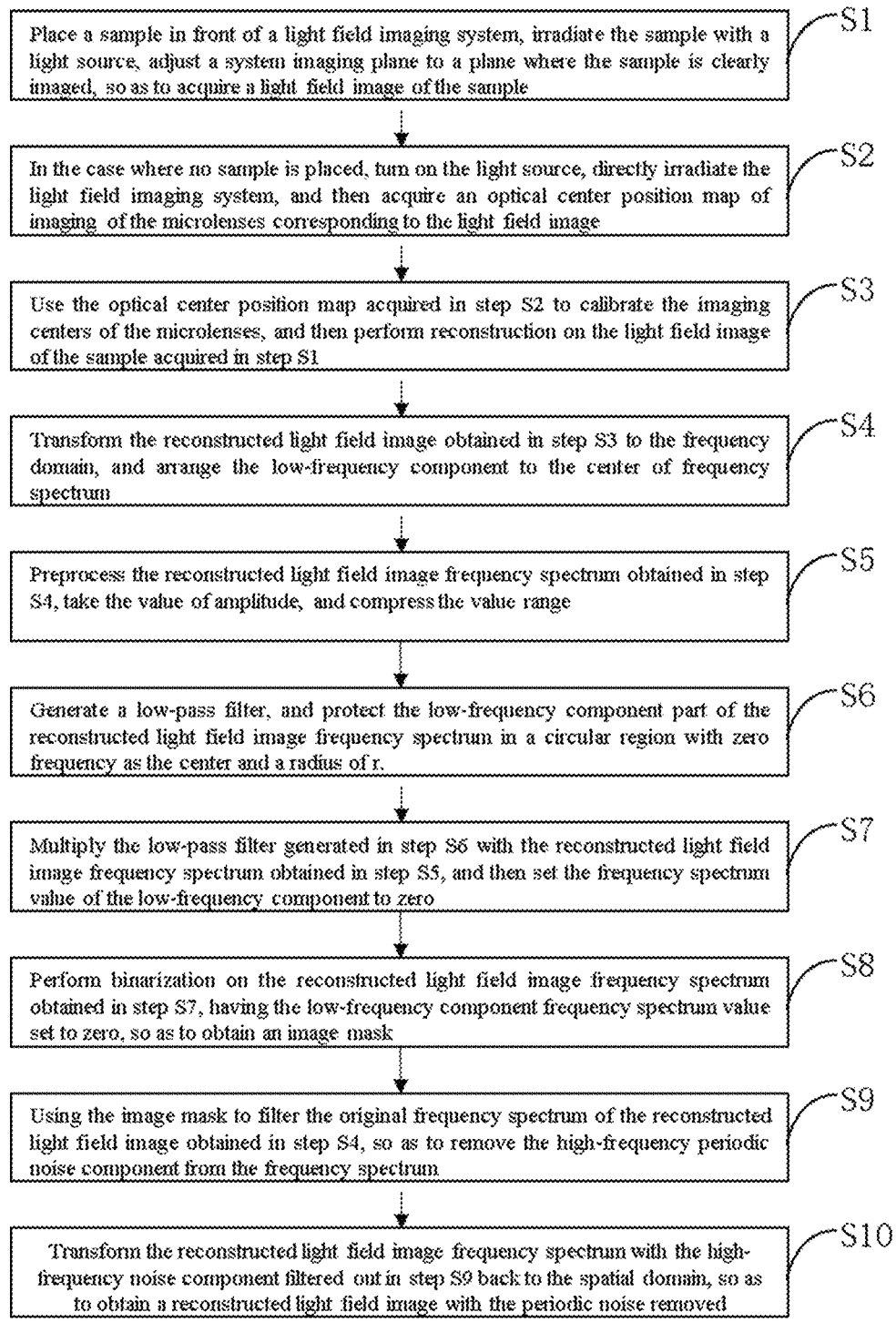
FIG. 1 is a flowchart of a method according to the present invention.

Referring to FIG. 1, according to the present invention, the frequency domain-based method for removing periodic noise from a reconstructed light field image includes the following steps.

S1: placing a sample in front of a light field imaging system, irradiating the sample with a light source, and adjusting the system imaging plane to a plane where the sample is clearly imaged, so as to acquire a light field image of the sample.

The principle of the light field imaging system of the present invention is based on a type-II light field camera. The light field imaging system includes a main lens, a microlens array and a sensor. A specific imaging process is as follows: a sample A is imaged in front of the microlens array by means of the main lens, that is, an image A'; and different subsections of the image A' are imaged on a sensor by the microlenses in the form of a relay system to obtain a light field image $I_f$ of the sample. In post-processing, non-overlapping parts of the microlens images on the sensor are stitched together to reconstruct a complete scene.

S2: keeping the light field imaging system consistent with that in step S1, in the case where no sample is placed, turning on the light source, directly irradiating the light field imaging system, and acquiring an optical center position map of imaging of microlenses corresponding to the light field image.

In order to integrate various microlens images in the reconstructed light field image $I_f$ to reconstruct a complete scene, it is necessary to determine the imaging center position of the microlenses in $I_f$. The imaging system is directly irradiated with the light source that is used as a sample. Insofar as it is ensured that the light source is sufficient to cover the entire microlens array after being imaged by means of a main lens, the microlenses can record light at sufficient angles and image the light as circles on a sensor, herein the centers of the circles serve as the imaging centers of the microlens, and thus the light field image of the light source may be used as an optical center position map for calculating the imaging centers of the microlenses.

When shooting, it needs to pay attention to adjusting an incident direction of the light source, so that the microlens image is close to a complete circle, and then the center of the circle can be regarded as the imaging center of the microlens; and it needs to pay attention to adjusting the distance between the light source and the imaging system such that the microlens images do not overlap.

S3: using the optical center position map acquired in step S2 to calculate the imaging centers of the microlenses, and then performing reconstruction on the light field image of the sample acquired in step S1.

The method for calculating the imaging centers of the microlenses includes: first, initializing two two-dimensional matrixes $C_x$ and $C_y$ with the same size as the microlens array, and respectively recording the horizontal and vertical coordinates of the imaging centers of the microlenses; then retrieving circles appearing in the optical center position map, and filling in center coordinates of a recognized circle into corresponding positions of the matrixes $C_x$ and $C_y$ as an imaging center position coordinates of the microlens at this position, and filling an interpolated value into the corresponding position of matrixes where a circle is not recognized, as an estimated value of the imaging center position coordinates of the microlens at this position.

A method for performing reconstruction on the light field image includes: taking out a rectangular pixel block with the imaging centers of the microlenses as the center and a side length of (2l+1), and according to the position of the microlens array, orderly stitching the pixel blocks taken out from the microlens images so that image contents of the adjacent pixel blocks can be connected to obtain a reconstructed light field image; adjusting the value of the length l to make the reconstructed image details clear and sharp, herein, the value of the length l is required to be less than a microlens radius. During reconstruction, it should be noted that the microlens images are inverted, so that it needs to horizontally flip each pixel block before stitching.

S4: transforming the reconstructed light field image obtained in step S3 to the frequency domain, and arranging the low-frequency component to the center of frequency spectrum.

A reconstructed light field image $I_r$ is transformed from the spatial domain to the frequency domain by Fourier transform, and a reconstructed light field image frequency spectrum $I_F$ is obtained:

$$I_F = F(I_r),$$

where, $F(\ )$ represents the Fourier transform. In the original spectrum, high-frequency components are distributed in the center of the spectrum, and low-frequency components are distributed on the periphery of the frequency spectrum. It is difficult to centrally process the low-frequency components, so they are rearranged, the half-space of the frequency spectrum is exchanged along each dimension, and the zero frequency is moved to the center of the frequency spectrum. Since the image can be regarded as a two-dimensional matrix, and the frequency spectrum is distributed in four quadrants, it only needs to exchange the first and third quadrants of the original frequency spectrum as well as the second and fourth quadrants to obtain a reconstructed light field image frequency spectrum with the low-frequency component arranged in the center of the frequency spectrum, which is still denoted as $I_F$.

S5: preprocessing the reconstructed light field image frequency spectrum obtained in step S4, i.e. taking the value of amplitude and compressing the value range.

Figure 2:
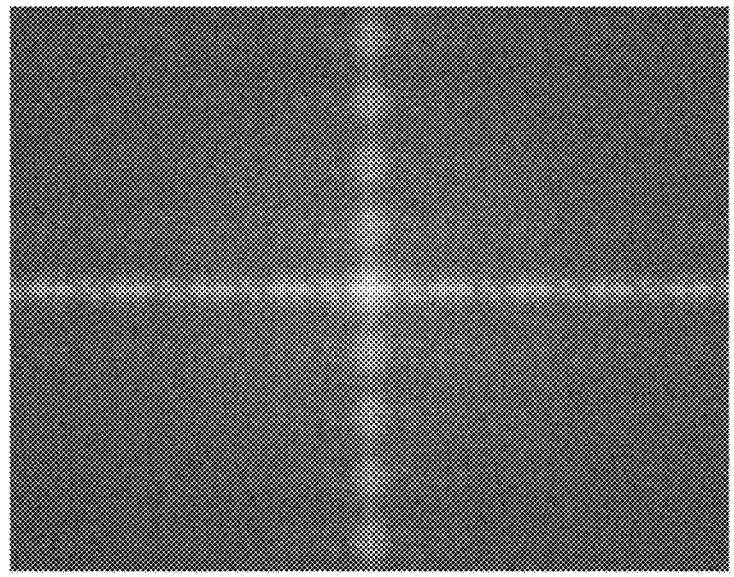
FIG. 2 is a schematic diagram of a reconstructed light field image frequency spectrum after being preprocessed according to the present invention.

The reconstructed light field image frequency spectrum $I_F$ obtained by the Fourier transform is a complex number, by taking the value of amplitude, an amplitude spectrum $|I_F|$ of Fourier transform of the reconstructed light field image is obtained. Since the frequency spectrum value of the low-frequency component is too high, other spectral components will be masked during a binarization operation, so that a logarithm of the amplitude spectrum $|I_F|$ of Fourier transform of the reconstructed light field image of the light field is taken to compress the value range. As can be seen in FIG. 2, a preprocessed reconstructed light field image frequency spectrum $I_F'$ is obtained:

$$I_F' = \log(|I_F|+1).$$

S6: generating a low-pass filter, and protecting the low-frequency component part of the reconstructed light field image frequency spectrum in a circular region with zero frequency as the center and a radius r.

A low-pass filter is a two-dimensional matrix Lp with the same size as the reconstructed light field image frequency spectrum $I_F$, herein, the two-dimensional matrix is divided into two parts by a circle with a radius of r of at the center: the value of a matrix inside the circle is set to zero, which means that the component corresponding to this region in an object to be processed is suppressed and filtered out; and the value of a matrix outside the circle is set to 1, which means that the component corresponding to this region in an object to be processed is not affected and passes normally. The image frequency spectrum obtained by processing of a matrix Lp is used as an initial state of the image mask in a subsequent operation to extract the reconstructed light field image frequency spectrum $I_F$, see S9, and after being filtered by the image mask, the low-frequency component in the circular region with a radius of l in the frequency spectrum $I_F$ is remained, and therefore, the final processing effect of the matrix Lp on the frequency spectrum $I_F$ appears as the low-pass filter. During processing, a range of low-frequency components that needs to be remained is controlled by adjusting the value of the radius r.

S7: multiplying the low-pass filter generated in step S6 with the reconstructed light field image frequency spectrum preprocessed in step S5, and then setting the frequency spectrum value of the low-frequency component to zero.

The low-pass filter matrix Lp is multiplied with the preprocessed reconstructed light field image frequency spectrum $I_F'$, the frequency spectrum value inside the circle with radius r is set to zero, so that a reconstructed light field image frequency spectrum $I_F''$ with the low-frequency component filtered out is obtained:

$$I_F'' = Lp \times I_F'.$$

Figure 3:
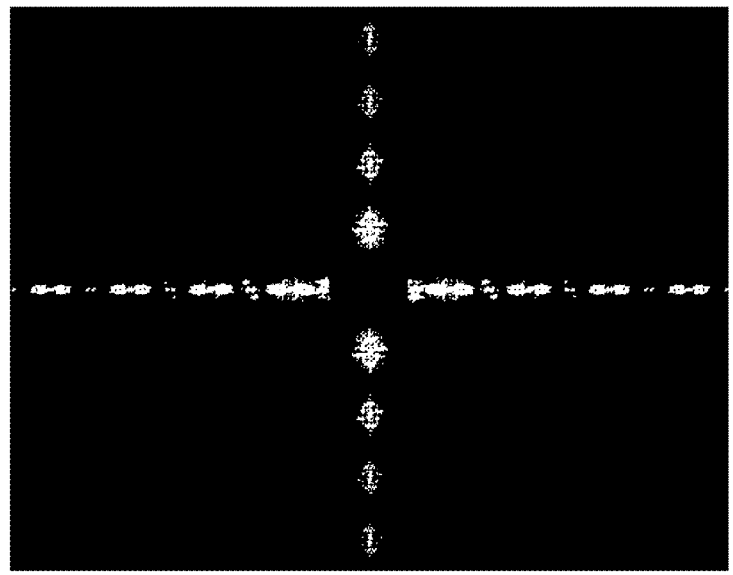
FIG. 3 is a schematic diagram of an image mask according to the present invention.

In a subsequent operation, $I_F''$ is used as the initial state of the image mask to protect the low-frequency component of the reconstructed light field image frequency spectrum $I_F$, the low-frequency component being a useful signal part of the reconstructed light field image $I_r$. The zeroed low-frequency component can be seen in a black circular region in the center of FIG. 3 (black indicates that the frequency spectrum value at this position is zero after binarization).

S8: performing binarization on the reconstructed light field image frequency spectrum, obtained by the processing of step S7, having the low-frequency component frequency spectrum value set to zero, so as to obtain an image mask.

A binarization threshold Tr is set, the image frequency spectrum obtained in step S7 is binarized. The part of the frequency spectrum value higher than Tr corresponds to the frequency component that needs to be filtered out of the frequency spectrum of the reconstructed light field image, so that the image mask M is obtained, it can be seen in FIG. 3, where black indicates a binarization value of 0, and white indicates a binarization value of 1.

Considering that the frequency spectrum value with the low-frequency component of the image frequency spectrum processed by the low-pass filter is set to zero, a corresponding value of the low-frequency component of the image mask obtained by binarization is required to be zero regardless of the value of the threshold Tr. For other frequency components other than the above-mentioned low-frequency component, due to the strong periodicity of the stitching edge noise, it is correspondingly shown on a spectrogram that the frequency spectrum value of some high-frequency components is relatively large; while the value of Tr is chosen appropriately, after binarization, the value of the image mask M corresponding to this part of high-frequency components is 1. During processing, a proportion of the frequency component with a value of 1 in the image mask M can be adjusted by changing the value of the threshold Tr, thereby adjusting the degree of noise suppression.

S9: using the image mask generated in step S8 to filter the original frequency spectrum of the reconstructed light field image obtained in step S4 to remove the high-frequency periodic noise component in the frequency spectrum.

The image mask M generated in step S8 is used to filter the reconstructed light field image frequency spectrum $I_F$ obtained in step S4; if the value of the image mask M corresponding to a certain frequency component is 1, then the frequency spectrum value of the component at the corresponding position in the image frequency spectrum $I_F$ is set to zero, so that a reconstructed light field image frequency spectrum $I_{Fd}$ with the high-frequency periodic noise component filtered out is obtained:

$$I_{Fd}(i, j) = \begin{cases} I_F(i, j), & M(i, j) = 0 \\ 0, & M(i, j) = 1 \end{cases},$$

wherein i=1 . . . r, j=1 . . . c, r, and c are respectively the number of rows and columns of the reconstructed light field image $I_r$.

S10: transforming the reconstructed light field image frequency spectrum with the high-frequency noise component filtered out in step S9 back to the spatial domain to obtain a reconstructed light field image with the periodic noise removed.

The reconstructed light field image frequency spectrum $I_{Fd}$ with the high-frequency periodic noise component filtered out is rearranged, and is transformed back to the spatial domain from the frequency domain through the inverse Fourier transform so as to obtain the reconstructed light field image $I_{rd}$ with the periodic noise removed:

$$I_{rd} = F^{-1}(I_{Fd}),$$

wherein $F^{-1}(\ )$ represents the inverse Fourier transform.

The invention claimed is:

1. The frequency domain-based method for removing periodic noise from a reconstructed light field image, comprising steps of:
   S1) using a light field imaging system to acquire a light field image of a sample;
   S2) removing the sample, directly irradiating the light field imaging system with a light source, and acquiring an optical center position map of imaging of microlenses corresponding to the light field image;
   S3) using the optical center position map to calibrate the imaging centers of the microlenses, and then performing reconstruction on the light field image acquired in step S1 to obtain a reconstructed light field image;
   S4) transforming the reconstructed light field image to the frequency domain, and arranging a low-frequency component to the center of frequency spectrum to generate a reconstructed light field image frequency spectrum;
   S5) preprocessing the reconstructed light field image frequency spectrum obtained in step S4 by taking the value of amplitude and compressing the value range;
   S6) generating a low-pass filter, and protecting the low-frequency component part of the reconstructed light field image frequency spectrum inside a circular region with zero frequency as the center and a radius of r;
   S7) multiplying the low-pass filter with the reconstructed light field image frequency spectrum obtained in step S5, and then setting the frequency spectrum value of the low-frequency component to zero;
   S8) performing binarization on the reconstructed light field image frequency spectrum obtained by the processing of step S7 to obtain an image mask;
   S9) using the image mask to filter the original frequency spectrum of the reconstructed light field image obtained in step S4 to remove a high-frequency periodic noise component from the frequency spectrum to generate a filtered reconstructed light field image frequency spectrum; and
   S10) transforming the filtered reconstructed light field image frequency spectrum back to the spatial domain to obtain a reconstructed light field image with the periodic noise removed.

2. The frequency domain-based method for removing periodic noise from a reconstructed light field image according to claim 1, wherein in step S2, the process of acquiring an optical center position map of imaging of microlenses corresponding to the light field image comprises:
   directly irradiating the imaging system with a light source as a sample, insofar as it is ensured that the light source is, after being imaged by means of a main lens, sufficient to cover the entire microlens array, recording, by means of the microlenses, light at sufficient angles, imaging the microlenses in circles on a sensor, the centers of the circles serving as imaging centers of the microlenses, thus using a light field image of the light source as an optical center position map for calculating the imaging centers of the microlens; and adjusting the distance between the light source and the imaging system such that the microlens images do not overlap.

3. The frequency domain-based method for removing periodic noise from a reconstructed light field image according to claim 1, wherein in step S3, the specific method for using the optical center position map to calibrate the imaging centers of the microlenses comprises:
   first, initializing two two-dimensional matrixes $C_x$ and $C_y$ with the same size as the microlens array, and respectively recording the horizontal and vertical coordinates of the imaging centers of the microlenses; then retrieving circles appearing in the optical center position map, and filling center coordinates of a recognized circle into corresponding positions of the matrixes $C_x$ and $C_y$ as imaging center position coordinates of the microlens at this position, and filling an interpolated value into the corresponding position of matrixes where a circle is not recognized, as an estimated value of the imaging center position coordinates of the microlens at this position.

4. The frequency domain-based method for removing periodic noise from a reconstructed light field image according to claim 1, wherein in step S3, the specific method for performing reconstruction on the light field image comprises:

in the light field image, taking out a rectangular pixel block with the imaging centers of the microlenses as the center and a side length of (2l+1), and arranging the pixel blocks according to the position of the microlens array, first flipping the pixel block taken out from the microlens images and then orderly stitching the flipped pixel block to obtain a reconstructed light field image, wherein a value of a length l is required to be less than a microlens radius.

5. The frequency domain-based method for removing periodic noise from a reconstructed light field image according to claim 1, wherein the specific method of S6 comprises:

initializing a two-dimensional matrix with the same size as the reconstructed light field image frequency spectrum, wherein the two-dimensional matrix is divided into two parts by a circle with a radius of r at the center, the value of a matrix inside the circle is set to 0 so that the component corresponding to the region inside the circle in an object to be processed is suppressed and filtered out; and a value of a matrix outside the circle is set to 1 so that the component corresponding to the region outside the circle in an object to be processed is not affected and passes normally.

6. The frequency domain-based method for removing periodic noise in a reconstructed light field image according to claim 1, wherein in step S8, the specific method for generating an image mask comprises:

multiplying the low-pass filter Lp with the preprocessed reconstructed light field image frequency spectrum $I_F'$ to obtain a reconstructed light field image frequency spectrum $I_F''$ having a low-frequency component frequency spectrum value set to zero:

$I_F''=Lp \times I_F'$;

setting a binarization threshold Tr, performing binarization on the reconstructed light field image frequency spectrum $I_F''$ having the low-frequency-component frequency spectrum value set to zero to obtain an image mask M, wherein the part of M with a value of 1 corresponds to a frequency component that needs to be filtered out of the reconstructed light field image frequency spectrum $I_F$; and adjusting a proportion of the frequency component with a value of 1 in the image mask M by changing the value of the threshold Tr, thereby adjusting the degree of noise suppression.

7. The frequency domain-based method for removing periodic noise in a reconstructed light field image according to claim 1, wherein in step S9, when the value of the image mask M corresponding to a certain frequency component is 1, the frequency spectrum value of the component at the corresponding position in the reconstructed light field image frequency spectrum $I_F$ is set to zero, so that a reconstructed light field image frequency spectrum $I_{Fd}$ with the high-frequency periodic noise component filtered out is obtained;

$$I_{Fd}(i,j) = \begin{cases} I_F(i,j), & M(i,j)=0 \\ 0, & M(i,j)=1 \end{cases},$$

wherein i=1 . . . r, j=1 . . . c, r, and c are respectively the number of rows and columns of a reconstructed light field image $I_r$.

* * * * *